(12) United States Patent
Leitch et al.

(10) Patent No.: US 8,725,548 B2
(45) Date of Patent: May 13, 2014

(54) DYNAMIC WORKFLOW APPROVALS

(75) Inventors: Matthew Leitch, Santa Cruz, CA (US); Robert Spillane, San Francisco, CA (US); M J Guru, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2936 days.

(21) Appl. No.: 10/187,351

(22) Filed: Jun. 28, 2002

(65) Prior Publication Data

US 2007/0179790 A1     Aug. 2, 2007

(51) Int. Cl.
*G06Q 10/00* (2012.01)

(52) U.S. Cl.
USPC ......... 705/7.26; 705/1.1; 705/7.12; 705/7.13; 707/608

(58) Field of Classification Search
CPC ............................ G06Q 10/0633; G06Q 10/00
USPC ........................ 707/1.1, 7.12, 7.13, 7.26, 608
See application file for complete search history.

(56) References Cited

U.S. PATENT DOCUMENTS

| | | | | |
|---|---|---|---|---|
| 5,315,504 | A * | 5/1994 | Lemble | 700/90 |
| 5,754,857 | A * | 5/1998 | Gadol | 709/203 |
| 5,926,100 | A * | 7/1999 | Escolar | 340/691.3 |
| 5,960,404 | A * | 9/1999 | Chaar et al. | 705/8 |
| 6,151,582 | A * | 11/2000 | Huang et al. | 705/8 |
| 7,058,649 | B2 * | 6/2006 | Ough et al. | 707/695 |
| 7,117,172 | B1 * | 10/2006 | Black | 705/35 |
| 7,408,658 | B2 * | 8/2008 | Twede | 358/1.15 |
| 2001/0032092 | A1 * | 10/2001 | Calver | 705/1 |
| 2002/0059264 | A1 * | 5/2002 | Fleming et al. | 707/100 |
| 2002/0091586 | A1 * | 7/2002 | Wakai et al. | 705/26 |
| 2002/0129135 | A1 * | 9/2002 | Delany et al. | 709/223 |
| 2003/0033167 | A1 * | 2/2003 | Arroyo et al. | 705/1 |
| 2004/0088246 | A1 * | 5/2004 | Jepsen et al. | 705/38 |
| 2006/0031746 | A1 * | 2/2006 | Toepfer et al. | 715/500 |
| 2007/0124361 | A1 * | 5/2007 | Lowry et al. | 709/201 |

OTHER PUBLICATIONS

Google Patent Searches, Dec. 10, 2013, pp. 1-2.*
Kumar, A. "Dynamic Routing and Operational Controls in Workflow Management Systems", Management Science, 1999, pp. 1-2.*
Kumar, A. "EROICA: A Rule-Based Approach to Organizational Policy Management in Workflow Systems", Advances in Web-Age Information Management 2002, pp. 201-212.*
"Setting Up Document Approval and Security", Oracle Purchasing Help, Jan. 31, 2001, pp. 1-3.*

* cited by examiner

*Primary Examiner* — Dean T Nguyen
(74) *Attorney, Agent, or Firm* — Kilpatrick Townsend & Stockton LLP

(57) ABSTRACT

A dynamic approval system, capable of integration with enterprise software systems, where approval requests are generated from within application programs and processed using one or more dynamic approval rules comprising discrete rule steps and step criteria. For each approval request, only those rule steps applicable to the requestor and type of request are processed. Individual rule steps may be reordered, added or skipped, as appropriate, during an approval process. Typical rule steps include at least one request for approval or review. The party receiving the request may be a specific individual, a person holding a specific position, or a person having a relative relationship, such as supervisor, with the requestor.

22 Claims, 11 Drawing Sheets

DYNAMIC WORKFLOW APPROVALS

BACKGROUND

1. Field of the Invention

The invention is in the field of enterprise software and more specifically in the field of approval management software.

2. Description of the Prior Art

Businesses use systematic approval methods to control decisions made within their organizations. These methods can be multi-step processes requiring authorization by multiple parties and therefore requiring significant time. Approvals are required in almost every activity of a large business. For example, purchasing requires approval for the expenditure of funds, human resources requires approval for hiring, and engineering requires design approvals.

In addition to requiring significant time, prior art approval methods are plagued with other problems. For example, it can be difficult to track approvals as they move through an organization and approval processes must be rigid to assure that all proper approvals are obtained. Software systems designed to assist in approval processes typically require that each approval scheme be specifically programmed and are thus inflexible. When requirements or personnel change, these inflexible systems require that computer code be rewritten accordingly. Software generally designed for approval tracking is also typically poorly integrated with enterprise software designed to accomplish tasks that need approval. For example, many organizations use one set of software to place purchase orders and a separate set of software to generate approvals. The use of separate systems contributes to the time and effort expended on these tasks and increases the probability of errors or unauthorized activities.

SUMMARY OF THE INVENTION

A system for processing an approval request, some embodiments of the system comprising an approval interface configured for an approver to approve or deny the approval request and an approval rule processor configured to a) load at least one dynamic approval rule including one or more rule steps characterized by rule step criteria, b) determine if at least one of the rule steps applies to the approval request, c) determine a rule step order using the dynamic approval rule, d) execute a first step of rule step order, the execution including delivery of the approval interface to the approver, and c) receive an approval from the approver.

Some embodiments of the invention include a dynamic approval system comprising a server connected to a computer network, and a database configured to operate on the server and to store a dynamic approval rule including at least one rule step having rule step criteria for determining if the rule step is applicable to an approval. These embodiments also include a workflow approval builder including a user interface configured to define the dynamic approval rule, the rule step, the rule step criteria, and values characterizing the rule step criteria; and an approval engine configured to load the dynamic approval rule from the database, to process the dynamic approval rule to determine at least one applicable rule step responsive to the rule step criteria, and to execute the applicable rule step.

Some embodiments of the invention include a dynamic approval rule builder comprising a rule design interface configured to receive input from a designer, the input characterizing the dynamic approval rule including a rule step for requesting approval from an approver, the input being for determining if an identity of the approver is dependant on an identity of a requestor or is independent of the identity of the requestor, and a rule generator configured to produce data defining the dynamic approval rule responsive to the input.

Some embodiments of the invention include an approval engine comprising an approval interface configured for presentation to a reviewer or an approver, the approval interface including commands configured to add another reviewer or another approver to a current approval process, and an approval rule processor configured to generate the approval interface responsive to a dynamic approval rule having a rule step associated with the reviewer or the approver.

Some embodiments of the invention include an approval engine comprising an approval interface configured for presentation to a reviewer or an approver, the approval interface including commands configured to approve a subset of an approval request, and an approval rule processor configured to generate the approval interface responsive to a dynamic approval rule having a rule step associated with the reviewer or the approver.

Some embodiments of the invention include a method of creating an approval rule, the method comprising a) presenting a rule design interface to a designer, b) creating a dynamic approval rule using input received through the rule design interface, c) creating a rule step for inclusion in the dynamic approval rule, the rule step being for sending an approval request or a review request to an approver or a reviewer respectively, d) defining rule step criteria characterizing conditions required for the rule step to be executed in an approval process, and e) saving data defining the rule step.

Some embodiments of the invention include a method of generating an approval responsive to an approval request, the method comprising a) executing an application including a business object operation, b) determining if the business object operation requires approval, c) executing an approval engine for processing a dynamic approval rule, the dynamic approval rule including a rule step and being assigned to the business object, the rule step being executed responsive to an identity of the business object, and d) setting a parameter indicating if the approval engine returns an approved or a denied status.

Some embodiments of the invention include a method of processing an approval request, the method comprising a) loading at least one dynamic approval rule including one or more rule steps characterized by rule step criteria, b) determining if at least one of the rule steps applies to the approval request c) determining a rule step order by processing the dynamic approval rule, d) executing a first step of rule step order, the execution including delivery of an approval interface to an approver, and e) receiving an approval from the approver.

Additional embodiments are disclosed herein.

BRIEF DESCRIPTION OF THE VARIOUS VIEWS OF THE DRAWING

FIG. 4 is an illustration of an embodiment of a rule design interface;

FIG. 5 is an illustration of an embodiment of a rule design interface configured to create a rule step;

FIG. 6 is an illustration of an embodiment of a rule design interface configured to create step criteria;

DISCLOSURE OF THE INVENTION

The invention includes a dynamic approval system intended to facilitate a wide variety of processes such as obtaining and tracking approvals. In comparison with the prior art, the dynamic approval system is more easily configured and adapted to changing conditions and requirements. For example, embodiments of the invention may automatically adjust an approval process responsive to a change in organizational structure or the position and privileges of a user.

In various embodiments the dynamic approval system is configured for applications in human resources, procurement, research and development, accounting, and the like. In addition, embodiments of the dynamic approval system are configured to integrate directly into software, such as network based enterprise applications, that facilitate the tasks requiring approval. As a result of this integration, the same programs used to accomplish a task, such as buying an electronic part, may also be used to obtain proper approvals for the purchase. This integration simplifies the purchasing process and prevents errors since a purchase order can be prevented from issuing until all appropriate approvals are meet. As illustrated further below, integration between the dynamic approval system and network based enterprise software enables intelligent management of the approval process.

The dynamic approval system of the present invention achieves its flexibility and versatility through the use of dynamic approval rules. A dynamic approval rule is a rule for determining approval and/or review of some activity or request. One or more dynamic approval rules are used in each approval process. Each dynamic approval rule includes at least one rule step characterized by rule step criteria and optional rule step criteria values. In a typical example, a rule step is configured to request approval from one person and the rule step is executed only if the associated rule step criteria are meet.

A dynamic approval rule is dynamic in that it is not necessarily "hard wired" in computer code or scripts. In contrast with the prior art, a dynamic approval rule includes a step or steps that may change dynamically responsive to an identity of the approval requester, a class of the approval, costs, personnel availability, changes in organizational structure, or the like. Dynamic approval rules may also have rule steps dynamically added or ignored during the performance of an approval process.

Figure 1:
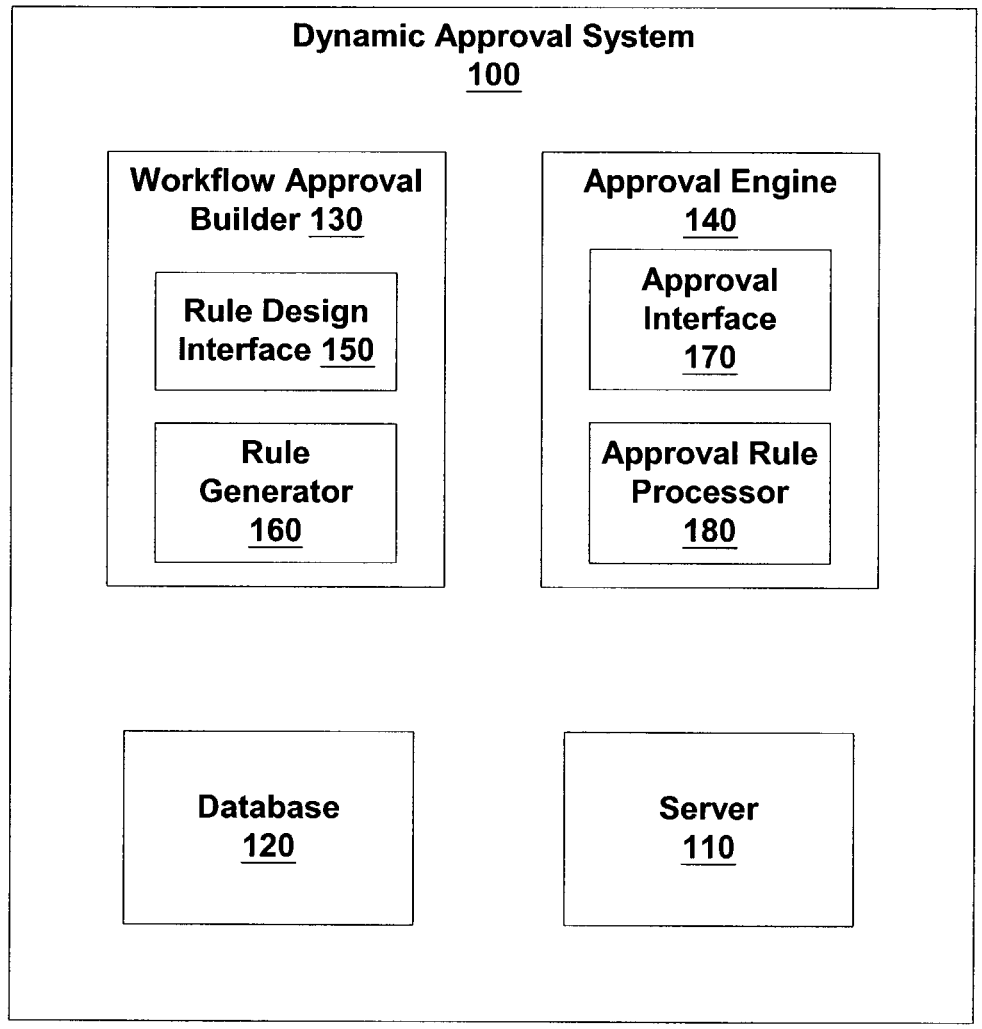
FIG. 1 is a block diagram of a dynamic approval system according to various embodiments of the invention.

FIG. 1 illustrates an embodiment of a dynamic approval system, designated 100, according to the invention. This embodiment includes a server 110 typically connected to a computer network and configured to support a database 120. Database 120 is configured to store at least dynamic approval rules and associated data. Data is stored in database 120 by a workflow approval builder 130 and retrieved from database 120 by an approval engine 140. Workflow approval builder 130 is used by a designer of an approval process to generate dynamic approval rules. In this generation process a rule designer interface 150 is presented to the designer for input characterizing a dynamic approval rule. In response to input provided by the designer, a rule generator 160 produces data defining one or more dynamic approval rules. This data is typically stored in database 120. Once defined, dynamic approval rules are optionally assigned to specific business objects (e.g. software routines designed to accomplish specific business tasks and optionally associated with departments such as sourcing, engineering, manufacturing definitions, production control, product configurations, quality control, accounting, sales, marketing, and the like), are passed as objects to other routines or are further modified for specific applications.

Approval engine 140 is configured to interpret dynamic approval rules and request approvals accordingly. In a typical embodiment, approval engine 140 includes an approval interface 170 for presentation to a party whose approval is requested. The solicited party and the contents of approval interface 170 are determined by an approval rule processor 180 configured to process dynamic approval rules such as those generated by workflow approval builder 130. Further details of methods used by workflow approval builder 130 and approval engine 140 are described below.

Figure 2:
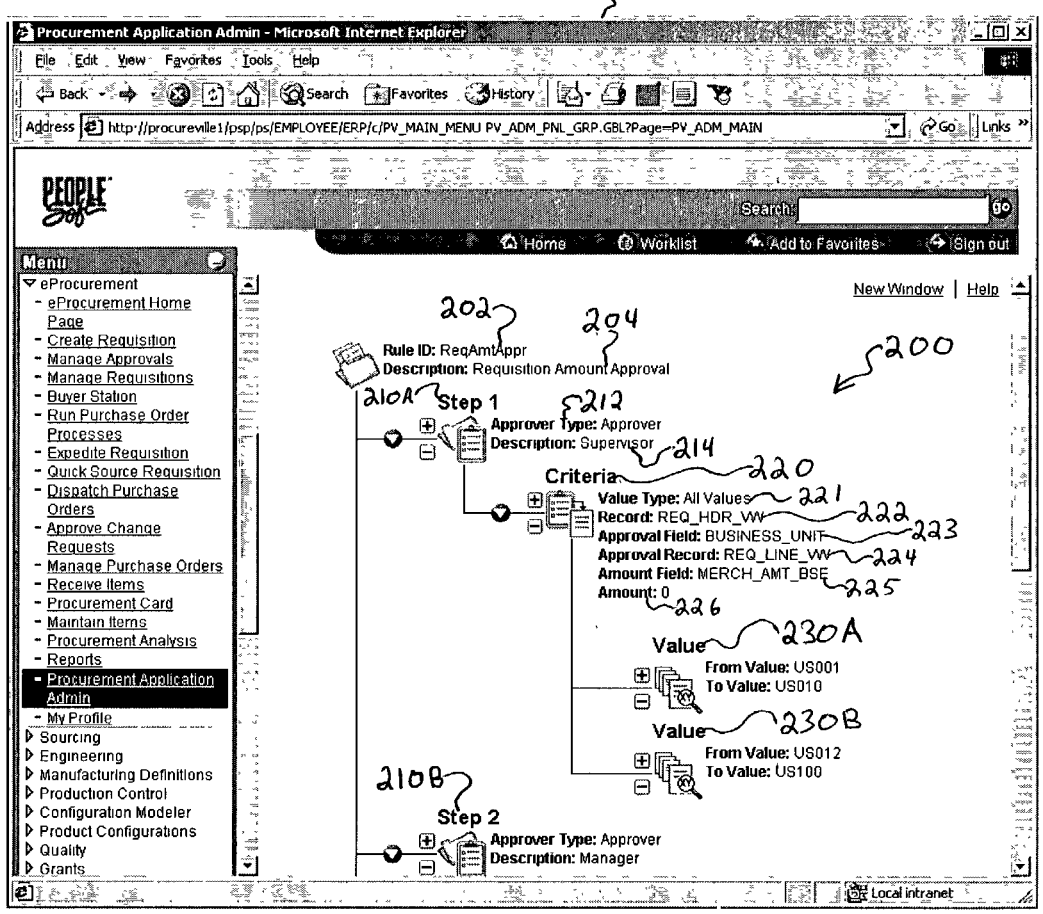
FIG. 2 is an illustration of a structure of a dynamic approval rule included in an embodiment of the invention.

A dynamic approval rule typically includes at least one "rule step," "rule step criteria" (or "criterion") associated with each approval step and one or more optional "criteria value" used to characterize the rule step criteria. FIG. 2 illustrates the structure of one dynamic approval rule included in an embodiment of the invention and generally designated 200. Dynamic approval rule 200 is identified using rule ID 202 and description 204. Rule ID 202 is a unique identifier used during assignment or access of dynamic approval rule 200. Every dynamic approval rule, such as dynamic approval rule 200, includes at least one rule step 210A and optionally further rule steps 210 such as rule step 210B.

Each rule step 210 typically includes a request for one approval from one party. However, in some embodiments rule step 210 may include requests for a list of related approvals. For example, in one of these embodiments rule step 210 includes a request for approval of either an entire purchase order or alternatively requests for approval of several line items within the purchase order. In other embodiments rule step 210 includes a request for approval from a pooled list of possible approvers. In one of these embodiments rule step 210 is completed if one member of the pooled list gives approval. In another of these embodiments rule step 210 is completed only after all members of the pooled list give approval.

Rule step 210A is characterized by an "approver type" 212 and a "description" 214. Examples of approver type 212 include "approver" and "reviewer." An approver is a party who is notified of a request and asked to approve or disapprove. A reviewer is a party who is notified of a request but not asked to approve or disapprove. For example, an instance of a rule step 210 may be used to notify a facilities department of a request to purchase computer hardware without requiring that the facilities department approve of the purchase.

Description 214 is used to establish the identity of the approver or reviewer. For example, in the embodiment illustrated by FIG. 2, description 214 is assigned the value "Supervisor" and the approver will therefore be the supervisor of the requester. "Supervisor" is a relative description 214 because it determines the approver through a relative relationship between the requestor and the approver. In order to resolve relative relationship embodiments of description 214, dynamic approval system 100 (FIG. 1) uses an organizational chart, optionally stored in database 120. In other embodiments description 214 refers to a specific person or a specific position in the business organization. For example, description 214 may be "William Smith" or "Chief Technology Officer" respectively. Using these descriptions 214 the approver is independent of the identity of the requestor.

Rule steps 210 are optionally executed in parallel or in series. In embodiments wherein dynamic approval rule 200 includes more than two steps various groups and subgroups of rule steps 210 are optionally executed in serial and parallel combinations. Typically a rule step order is initially determined during the development of dynamic approval rule 200.

Each rule step is subject to one or more criteria. For example, rule step 210A is only executed if criteria 220 are satisfied. In the embodiment illustrated by FIG. 2, criteria 220 includes "Value Type" 221, "Record" 222, "Approval Field" 223, "Approval Record" 224, "Amount Field" 225 and "Amount" 226. The determination of which criteria apply to a specific dynamic approval rule is optionally determined responsive to a business object to which the rule is assigned. For example, a purchasing business object may have the Amount 226 parameter used to indicate a cost while an engineering business object may not have a cost associated with approval of a design and therefore not require the amount 226 parameter.

Approval field 223 is distinct in that it is evaluated using values 230, such as criteria values 230A and 230B associated with the step criteria 220. In the example illustrated by FIG. 2, Approval Field 223 is set to the type "Business_Unit" and therefore criteria values 230A and 230B are interpreted as specifying that the business unit of the current business object must be within the ranges US001-US010 and US012-US100. If this condition, relating to approval field 223, is not satisfied then rule step 210A does not apply to the current approval request and will not be executed.

In some embodiments rule step 210 is only executed when all of criteria 220 are satisfied. If any of criteria 220 are not satisfied step 210 is skipped and the approval rule 200 proceeds to the next rule step 210. In these embodiments, in order for dynamic approval rule 200 to be considered in the approval process, at least one rule step 210 must meet all criteria 220. In alternative embodiments only one of the associated criteria 220 need be satisfied in order for a rule step 210 to qualify for execution.

In some embodiments of the invention, rule steps 210 may change dynamically during the processing of an approval request. For example, in one embodiment rule step 210 must be approved within a specific time period. If an approver does not respond within this time period rule step 210 is either skipped or directed to an alternative approver. In a similar manner, a rule step 210 may automatically be skipped or redirected when an approver is on vacation or is otherwise no longer available.

An approver is optionally not permitted to approve their own requests. For example, in an embodiment where a hardware manager approves all computer hardware purchases, the hardware manager is not asked to approve his own request, above a certain dollar limit, for a computer. In such a case the applicable rule step 210A is skipped or directed to an alternative approver.

In various embodiments of the invention the one or more steps 210 can be eliminated during an approval process. For example, if dynamic approval rule 200 includes rule steps 210 that request approval from an immediate supervisor and also from a higher level manager, the approval from the supervisor may no longer be necessary once the manager has approved. The unnecessary rule step associated with the supervisor is optionally skipped and the approval process escalates to the next rule step. If approvals are requested in parallel and the manager gives her approval first then the request to the supervisor is optionally cancelled. Likewise, dynamic approval system 100 will notice if the manager's approval is required regardless of the supervisor's approval. In these cases, since the supervisor's approval is superfluous, a rule step 210A requesting approval from the supervisor may never be executed or, alternatively, the approver type of this rule step 210A may be changed from approver to reviewer.

In various embodiments of the invention rule steps 210 can be added during an approval process. Additions can be made by approvers or reviewers who wish to involve other "ad hoc" parties in an approval process.

In one embodiment an order of rule steps 210 is changed by adding a new rule step 210 including an approver who was already associated with an existing rule step 210 in the current approval rule 200. Since, typically, an approver need only give approval once during any given approval process, the second approval is redundant and is skipped by dynamic approval system 100. Because the new rule step 210 may be in a different position in the rule step order, the order of rule step execution may be changed.

Rule steps 210 can be generally categorized as "internal" or "external." Internal rule steps, such as rule step 210A, are related to criteria 220 developed using workflow approval builder 130. External rule steps do not necessarily depend exclusively on criteria 220 but alternatively include links to external processes, data, and/or rules. For example, an external rule step may use an organization chart associated with a specific project or ad hoc work group instead of a default business organizational chart. Since this data is external it can more easily be maintained and modified by users who would normally not be permitted to change the business organizational chart. Ad hoc work groups may also be organized such that the business organizational chart would inadequately represent relationships within the group.

Dynamic approval rule 200 optionally includes rule steps 210 configured to perform special functions. For example, a rule step 210 may be a "stop step" wherein approval or disapproval halts analysis of the current approval rule or the entire approval process. In an illustrative embodiment, wherein all hiring must be approved by the Vice President of human resources, dynamic approval rule 200 would include a stop step associated with this Vice President. If she disapproves such a request, all other requests for approval from other approvers are cancelled. In another example of rule steps 210 configured to perform special functions, "line item steps" may be configured to approve or disapprove specific line items in an approval request.

Figure 3:
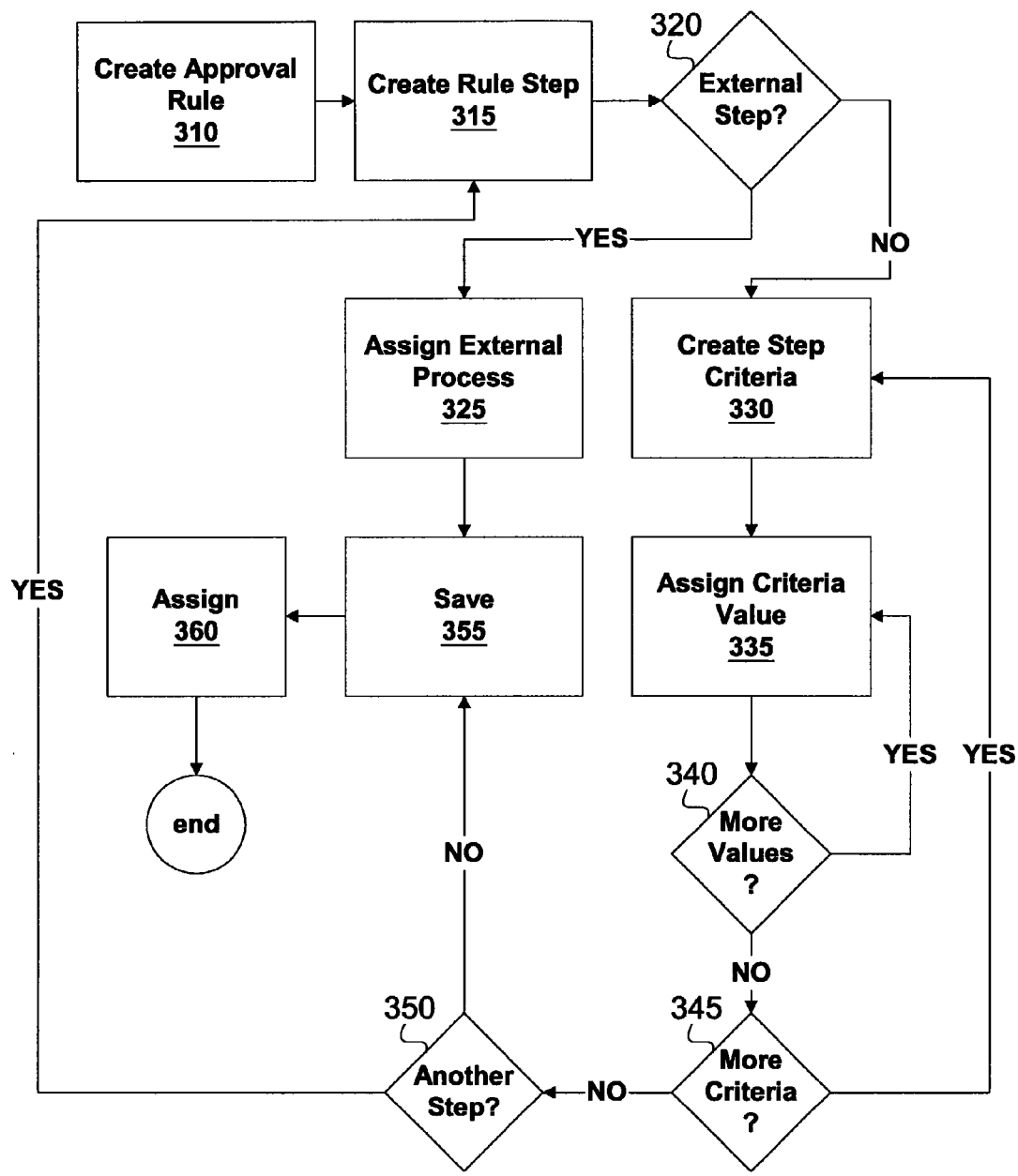
FIG. 3 is an illustration of a method of generating an approval rule according to various embodiments of the invention.

FIG. 3 illustrates a method of generating a dynamic approval rule 200 according to various embodiments of the invention. This method is optionally performed using workflow approval builder 130. In a create approval rule step 310 rule design interface 150 is used to enter data characterizing the desired dynamic approval rule. In this step parameters applying to the entire dynamic approval rule are specified. For example, a rule ID, and description are assigned. Optionally specified are options for enabling escalation. Escalation is a process by which rule steps are skipped as a result of a time-out, unavailability of a reviewer, rule step redundancy or dynamic rule step elimination. Escalation options include time-out periods and the delivery of escalation event notices, among others.

Following create approval rule step 310 a rule step 210 is added to the new dynamic approval rule 200. This rule step 210 is generated in a create rule step in step 315 using rule design interface 150. In step 315 parameters applicable to all of the new rule step 210 are determined. These parameters generally include a step number, description 214, approver type and step type (internal or external).

A query step 320 determines whether the new rule step 210 has been defined as an external or an internal step. If it is external, then an assign external process step 325 is executed. In step 325 criteria assigning an external process or data to the new rule step 210 is generated and saved in a step 355. Typically, an external step includes no further criteria. However, in alternative embodiments (not shown) additional criteria may be defined. If the new rule step 210 is not external, create step criteria step 330 is optionally performed to create criteria 220 for the new rule step 210. In create step criteria step 330 criteria such as value type 221 (FIG. 2), approval field 223, and amount 226 are specified. In one instance, a monetary figure of 100 is associated with amount 226 criteria. In this instance the associated rule step 210 is only executed for requests involving more than 100 US dollars.

Create step criteria 330 is followed by an optional assign criteria value step 335. In step 335 a value 230 or value range is associated with the criteria established in create step criteria step 330. In some embodiments this value 230 or value range is applicable only to the approval filed 223 criteria. If, in a query step 340 it is determined that further criteria values 230 are desired, then assign criteria value step 335 is repeated. Likewise, if in query step 345 it is determined that further criteria 220 are required for the new rule step 210, then the method may return to create step criteria step 330. Finally, following query step 350 in which the a desire for additional rule steps 210 is determined, the method either returns to create rule step 315, for adding another rule step 210 to dynamic approval rule 200, or alternatively performs save step 355 to store generated rule data in database 120 (FIG. 1). After the generated rule data is saved the newly generated dynamic approval rule 200 is optionally assigned to a business object in an assign step 360.

Figure 4:
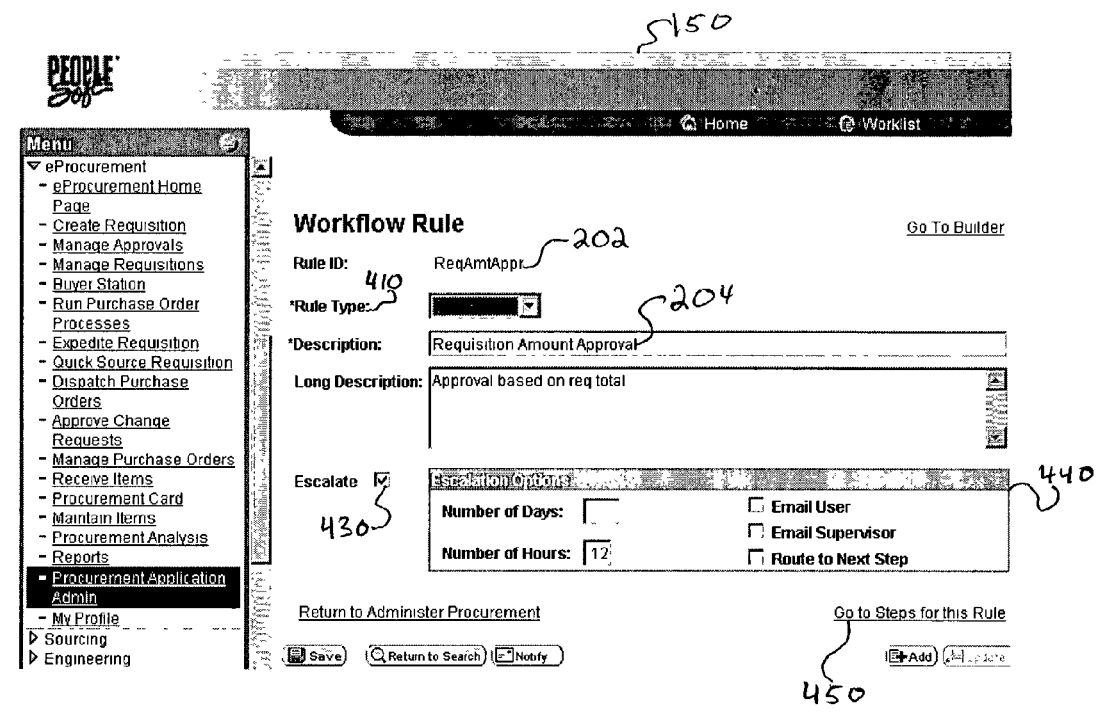

FIG. 4 illustrates an embodiment of rule design interface 150 used to perform create approval rule step 310 of FIG. 3. This embodiment includes fields for entering Rule ID 202, rule type 410 and description 204. Rule type 410 is used to specify a dynamic approval rule 200 as including "static" or "dynamic" rule steps 210. Also included are checkboxes for enabling escalation 430 and specifying escalation options 440. The hyperlink "Go to Steps for this Rule" 450 is used to execute create rule step in step 315 of FIG. 3.

Figure 5:
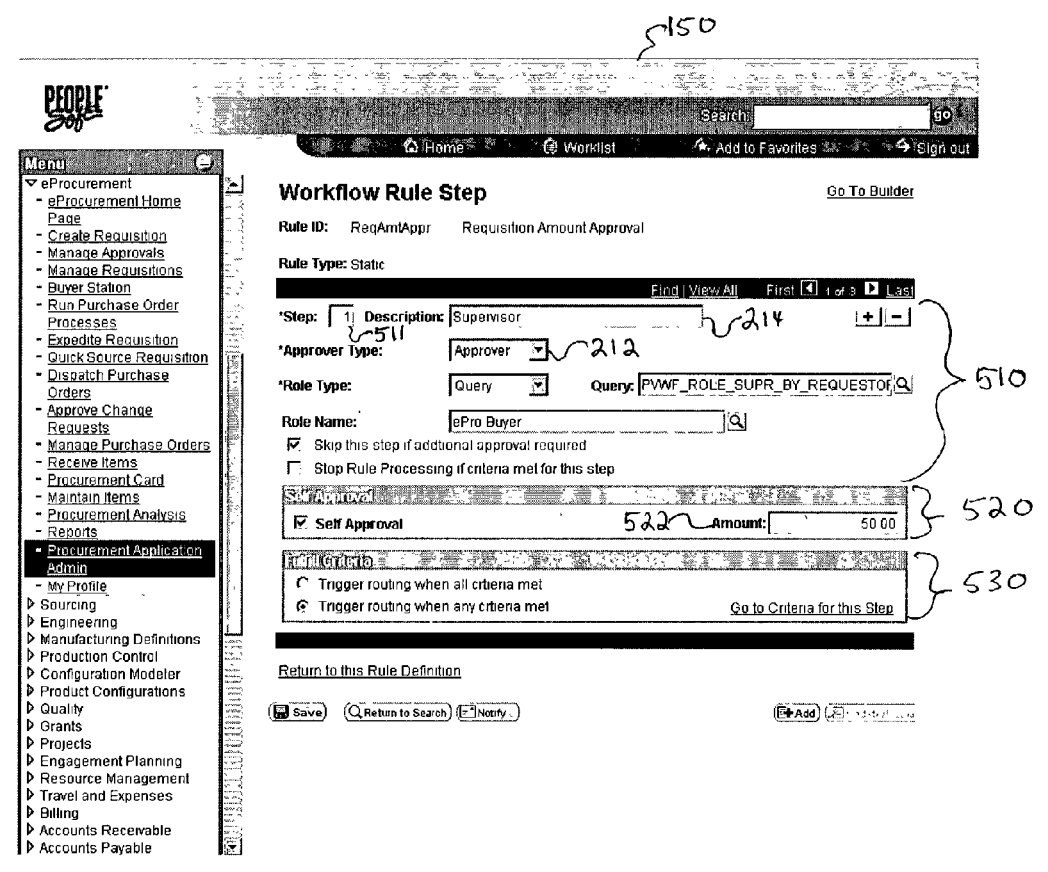

FIG. 5 illustrates an embodiment of rule design interface 150 configured to perform create rule step in step 315 of FIG. 3. This embodiment includes a first data entry table 510 used to enter data such as step number 511, description 214 and approver type 212. A self approval table 520 is configured to indicate a specific amount 522 authorized for self approval. Finally, a fulfill criteria table 530 is optionally used to establish criteria logic and to initiate create criteria associated with the new rule step 210.

Figure 6:
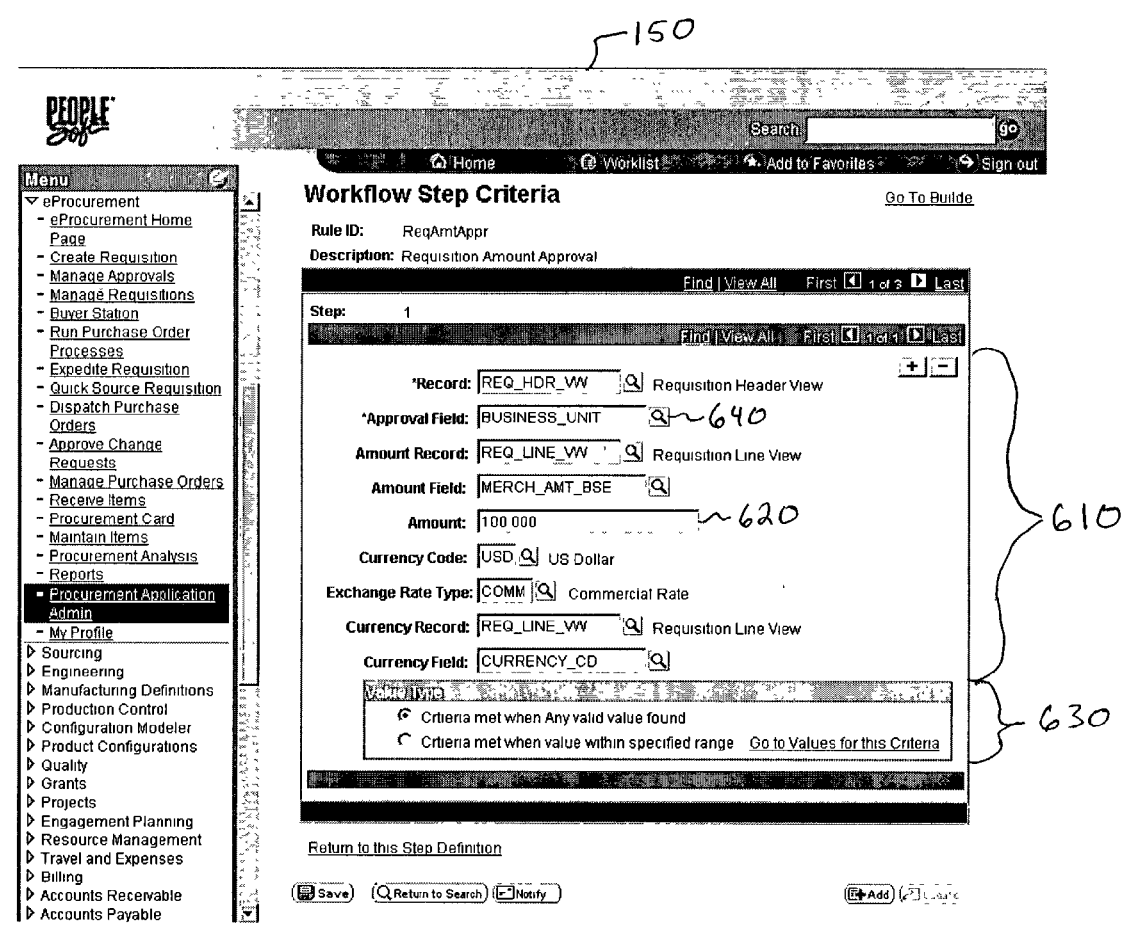

FIG. 6 illustrates an embodiment of rule design interface 150 configured to perform create step criteria step 330 of FIG. 3. In this embodiment a data entry table 610 is used to enter data, such as an amount 620 of 100.000. In this instance the associated rule step 210 is only executed for requests involving more than 100 US dollars. A value type table 630 is used to set value logic or access another embodiment of design interface 150 for setting values associated with approval field 640.

Figure 7:
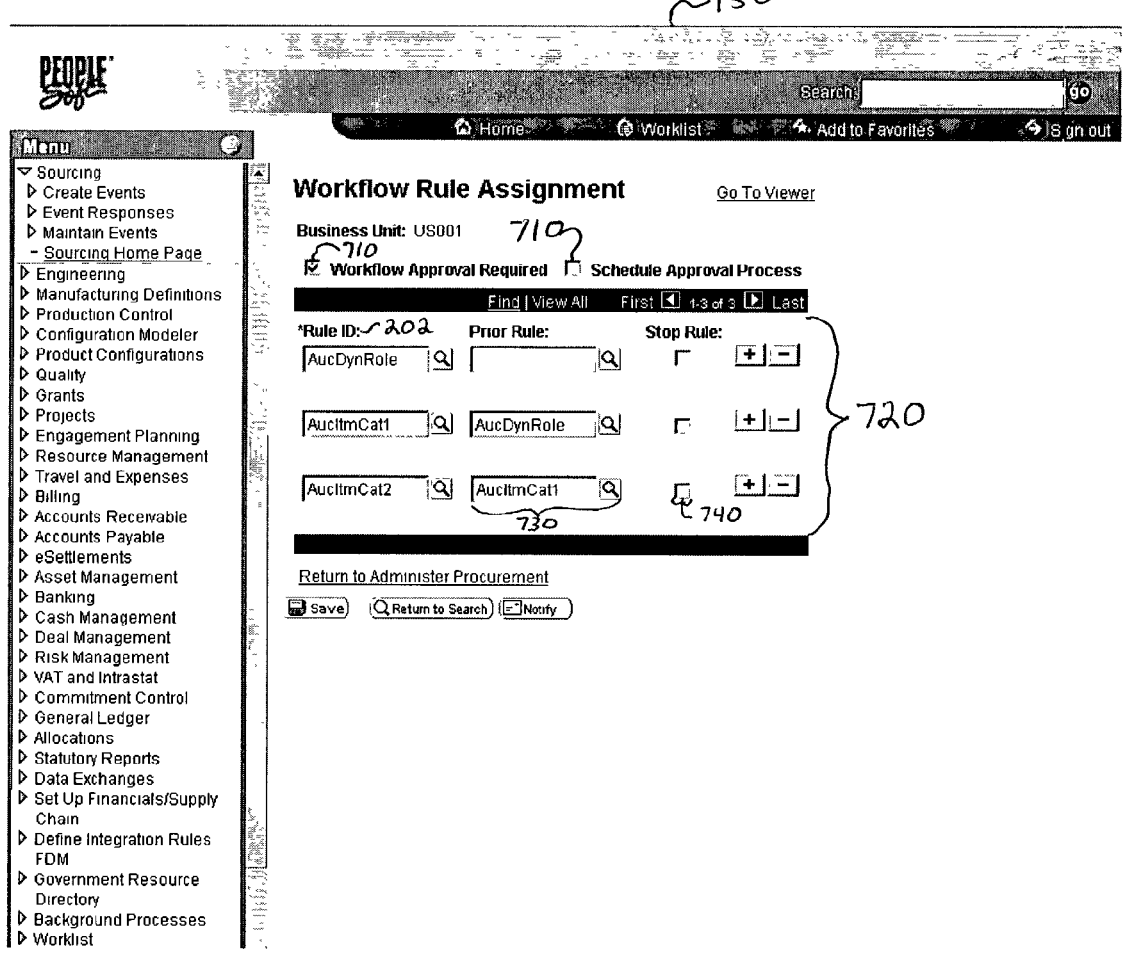
FIG. 7 is an illustration of an embodiment of a rule design interface configured to assign an approval rule to business object.

FIG. 7 illustrates an embodiment of rule design interface 150 configured to assign approval rules to business objects as in assign step 360. Two checkboxes 710 are used to indicate if assigned rules are to be used for workflow approval or schedule approval. Rules to be assigned are indicated by their Rule ID 202 in a table 720. A second column 730, in table 720, is used to indicate the order of dynamic approval rule 200 priority. A given dynamic approval rule 200 may be the prior rule for more than one other dynamic approval rule 200. This allows both serial and parallel ordering of approval rule consideration. A third column 740 is used to indicate if a dynamic approval rule 200 is a stop rule. The number of rules indicated in FIG. 7 is an illustrative example. Business objects may be assigned none, one, or a plurality of rules.

Figure 8:
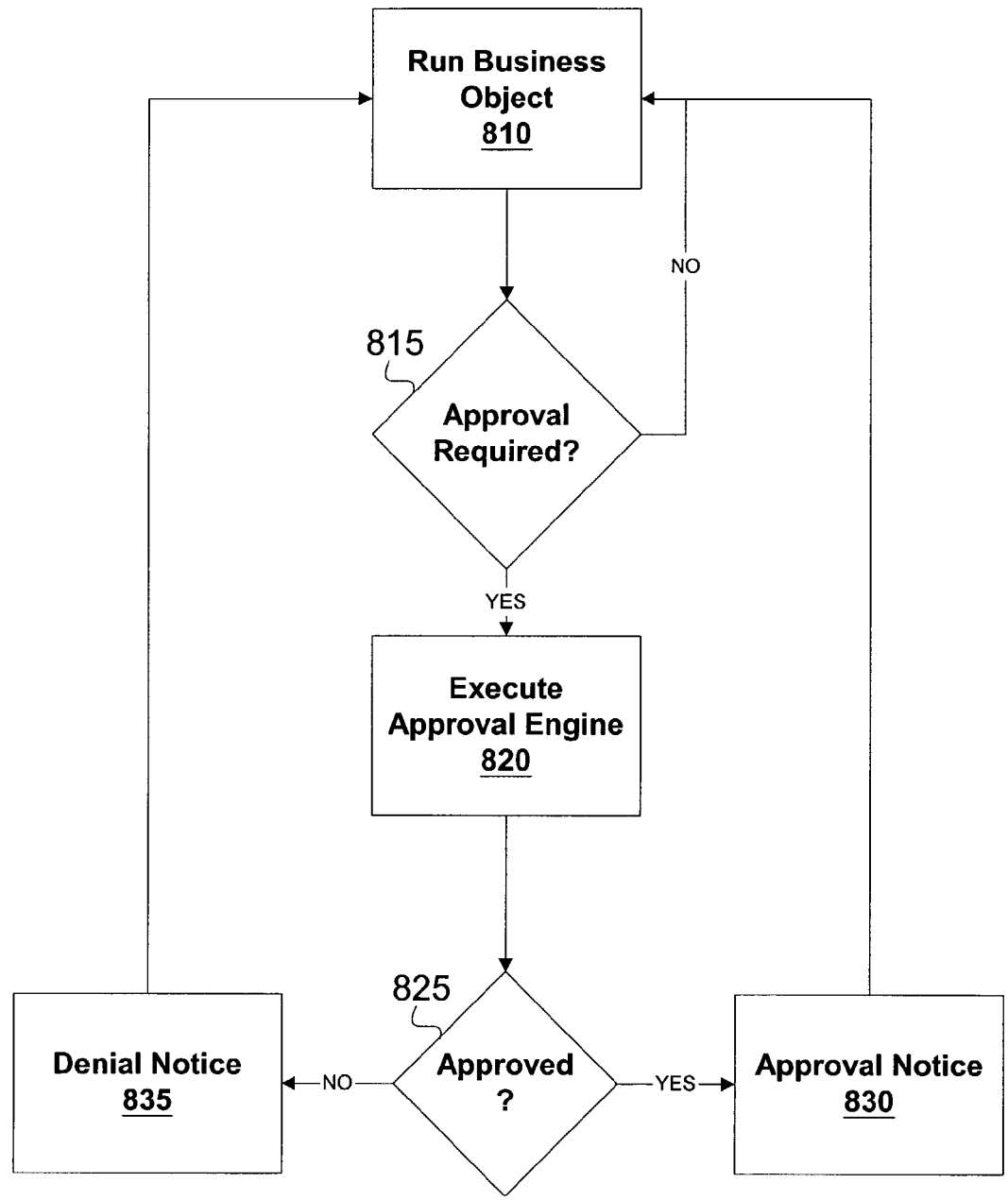
FIG. 8 is an illustration of a method of using a dynamic approval system according to various embodiments of the invention.
Figure 9:
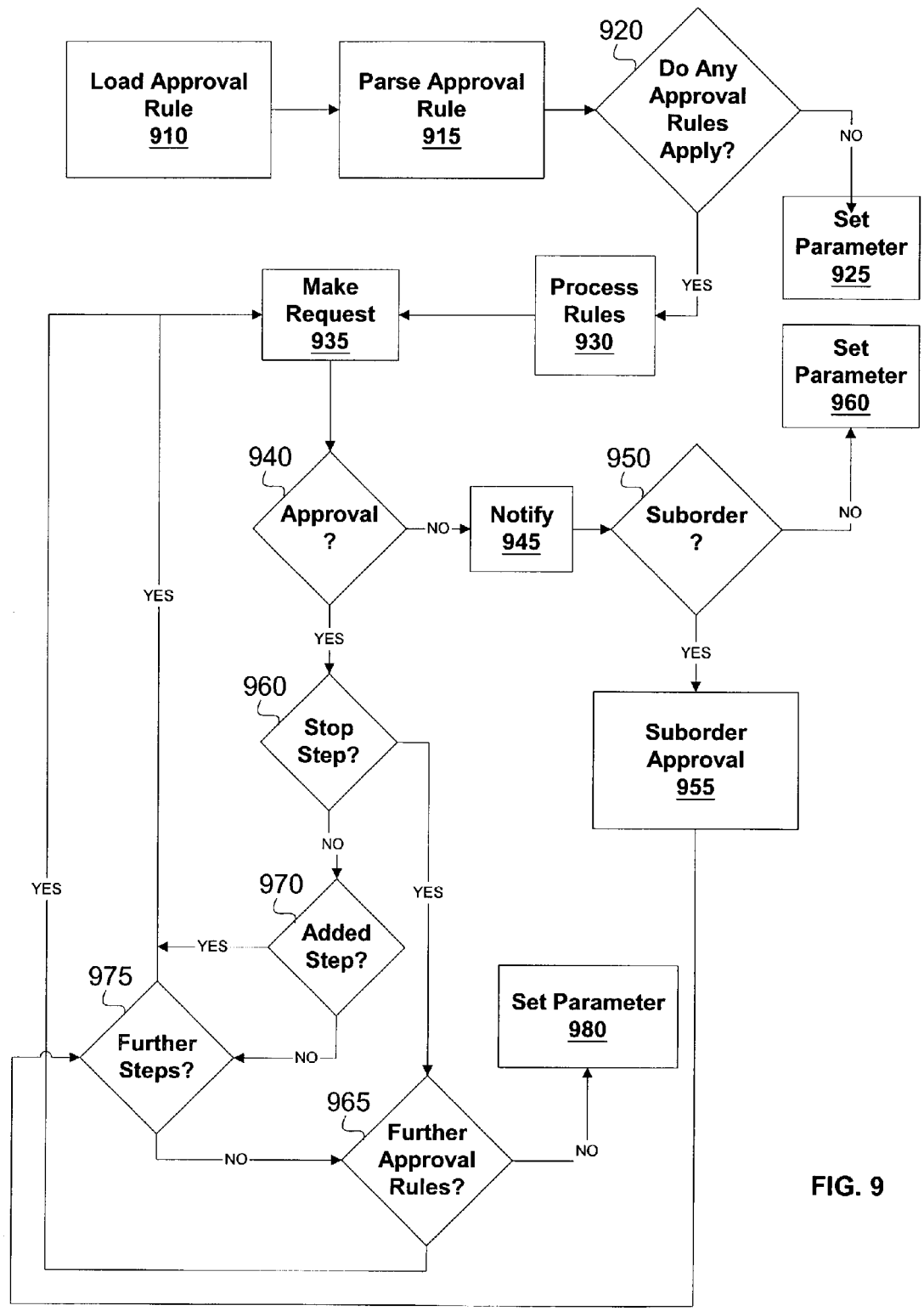
FIG. 9 is an illustration of further details of an execute approval engine step.

FIG. 8 illustrates a method of using dynamic approval system 100 according to various embodiments of the invention. In a run business object step 810 a business object is executed. The business object is optionally part of an enterprise application which is optionally an internet application configured to operate using HTML/Java based interfaces. In a typical example the business object is used to make a request, such as approval of an engineering drawing. Depending on the nature of the request, a developer of the business object may have previously indicated that approval for the request is needed. If so, this requirement is determined in query step 815. If approval is not needed no further action is taken and the business object continues execution without interruption. However, if approval is required, approval engine 140 is executed in an execute approval engine step 820 to process dynamic approval rules 200 assigned to the business object. Execute approval engine step 820 is optionally performed using approval rule processor 180 and results in setting of a parameter indicating whether the request was approved, denied, or otherwise qualified. Further details of step 820 are illustrated in FIG. 9 below. Following execute approval engine step 820, a query step 825 examines whether the request has been approved. If so, then an optional approval notice step 830 is used to notify the requester, and optionally other parties involved in the request, of the approval. If not, then an optional denial notice step 835 is used to notify the requester, and optionally other parties involved in the transaction, of the denial. Finally, the method optionally returns to step 810 wherein the business object continues execution.

FIG. 9 illustrates further details of execute approval engine step 820. In the illustrated embodiment execute approval engine step 820 begins with a load approval rule step 910 where one or more dynamic approval rules 200 assigned to the current business object are loaded from database 120. In a parse approval rules step 915 applicability of the loaded rules 200 to the current approval request is examined. This examination includes comparison of each rule step 210 and associated criteria 220 with characteristics of the approval request. For example, a business unit associated with the current business object may be compared with criteria 220 specifying that a rule step 210 applies only to certain business units. In another example, the value of the current approval request is compared with an amount 226 (FIG. 2). The applicability of each rule step 210 within the loaded dynamic approval rules 200 is determined based on these and similar comparisons. At least one rule step 210 within a dynamic approval rule 200 must have criteria 220 that is satisfied for the particular dynamic approval rule 200 to be considered further in the current approval request. A query step 920 is used determined if parse approval rule step 915 has found that any of the loaded dynamic approval rules 200 apply to the current request. If not, a value indicating that no approval is needed is set in a set parameter step 925 and the instance of execute approval engine step 820 is completed.

If at least one dynamic approval rule 200 is found to apply to the current approval request, the method continues to a process rules step 930. In process rules step 930 at least one step order of applicable rule steps 210 is determined. This step order may include both serial and parallel sequences. Rule steps 210 from different approval rules 200 are optionally interspersed in a single step order. In some embodiments different dynamic approval rules 200 are used to generate separate rule step orders that are independently processed sequentially or in parallel. In some embodiments rule steps 210 that require a response from the same approver are combined to reduce the number of requests that each approver must respond to. For example, if one rule step 210 requires a response from the requestor's supervisor and another rule step 210 requires a response from the chief product engineer, these may both be the same person. In this case, both of these rules steps 210 are combined into a single rule step 210 for the purposes of the current approval request. Rule steps 210 may be combined from within the same approval rule 200 or from separate dynamic approval rules 200.

After a step order is determined the method proceeds to a make request step 935 where the first rule step 210 of a current step order is performed. In embodiments having parallel sequences make request step 935 may include performing several rule steps 210. The performance of a rule step 210 includes delivery of a request to a reviewer or approver and, if necessary, waiting for an approval. In various embodiments performance of a make request step 935 also includes monitoring of "time-out" status for pending requests, adjustment of the step order responsive to the introduction of ad hoc steps, or the like.

After a response is received from an approver, or a time-out occurs, a query step 940 examines if approval has been received. If not, the requestor is notified in a notify step 945. In some embodiments notify step 945 is followed by a query step 950 that examines if the denial of approval applied to the entire approval request or a subset of the approval request. If approval of suborders (e.g. line items) is still possible, the method continues with a suborder approval step 955. In suborder approval step 955 the non-approved items within the order are marked as not approved. The method then continues to a query step 975 for determining if rule steps 210 remain to be executed. If in query step 950 it is determined that no approval of suborders is possible a value indicating this result is set in a set parameter step 960 and the instance of execute approval engine step 820 is completed.

If, in query step 940, approval has been received, the method optionally continues to a query step 960 in which it is determined if the approved rule step 210 is a stop step that would indicate that the current dynamic approval rule 200 is satisfied. If the approved rule step 210 is a stop step then a query step 965 is optionally executed to examine the existence of additional applicable dynamic approval rules 200.

If, in query step 960, the approved rule step 210 is found not to be a stop step the method continues to a query step 970 in which the presence of any new rules steps 210, added during make request step 935, is determined. If new rule steps 210 have been added, then the method returns to make request step 935 wherein the next rule step 210 in the rule step order is processed. If a new rule step 210 has not been added, the method continues to a query step 975 wherein the presence of further rules steps 210 in the step order is examined. If a further rule step 210 is to be processed, the method returns to make request step 935. If no further rule steps 210 are pending in the current rule step order the method optionally proceeds to query step 965. If, in query step 965, it is determined that additional approval rules are to be executed, then the method returns to make request step 935 wherein the next rule step order is processed.

If no additional approval rules are to be executed the method continues from query step 965 to set a parameter step 980. Set parameter step 980 waits until all parallel executions of steps 935 through 965 are completed with approvals. If all approvals are received, set parameter step 980 includes setting a value indicating that approval has been received for the requested task and execute approval engine step 820 is complete.

Figure 10:
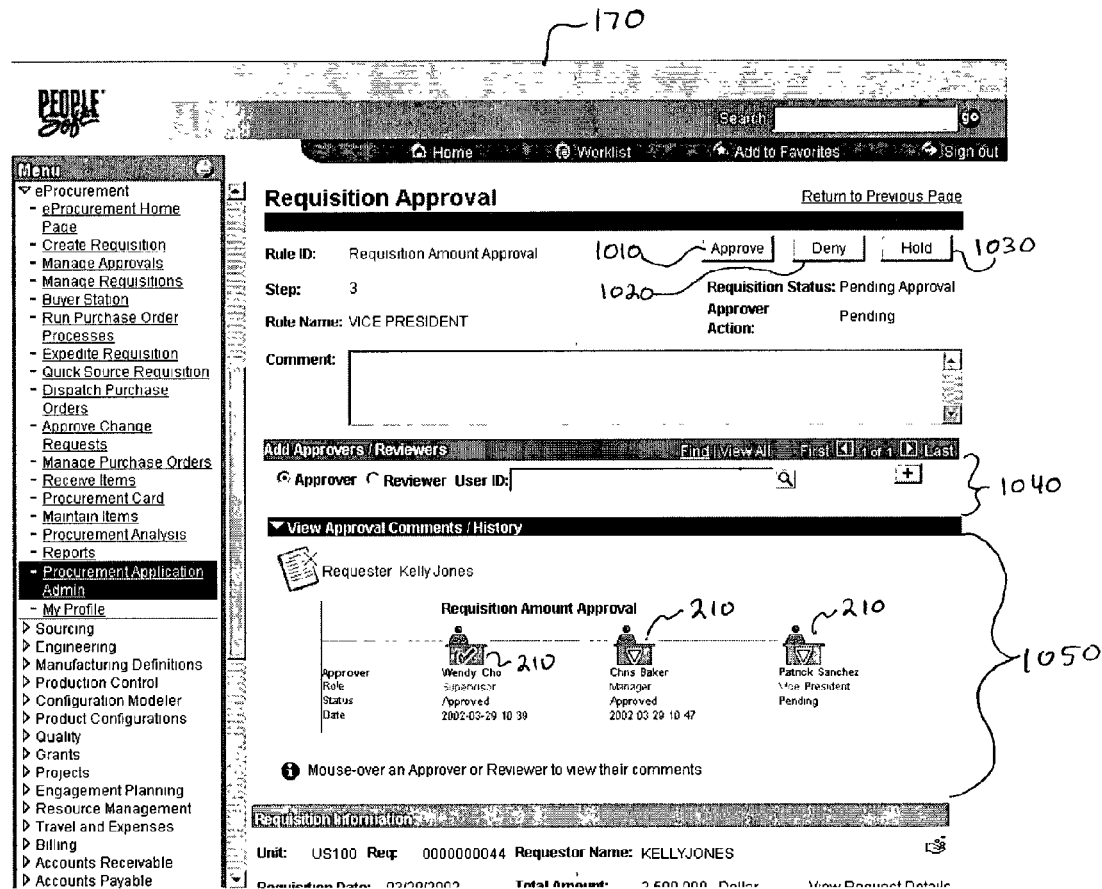
FIG. 10 is an illustration of an embodiment of an approval interface configured to convey an approval request to an approver.

FIG. 10 illustrates an embodiment of approval interface 170 configured to convey an approval request to an approver in make request step 935. This embodiment of approval interface 170 includes "approve" 1010, "deny" 1020 and "hold" 1030 buttons for indicating the approver's choice. A row 1040 optionally includes commands configured to add an ad hoc reviewer or approver to the current approval process. Addition of an ad hoc reviewer or approver results in a new rule step 210 being added to the current approval process. A region 1050 optionally shows to an approver a current status of the approval request. Region 1050 may show rule steps 210 executed both in series and in parallel. This embodiment of approval interface 170 is optionally configured for presentation using a browser supporting only standard HTML/Java script protocols.

Figure 11:
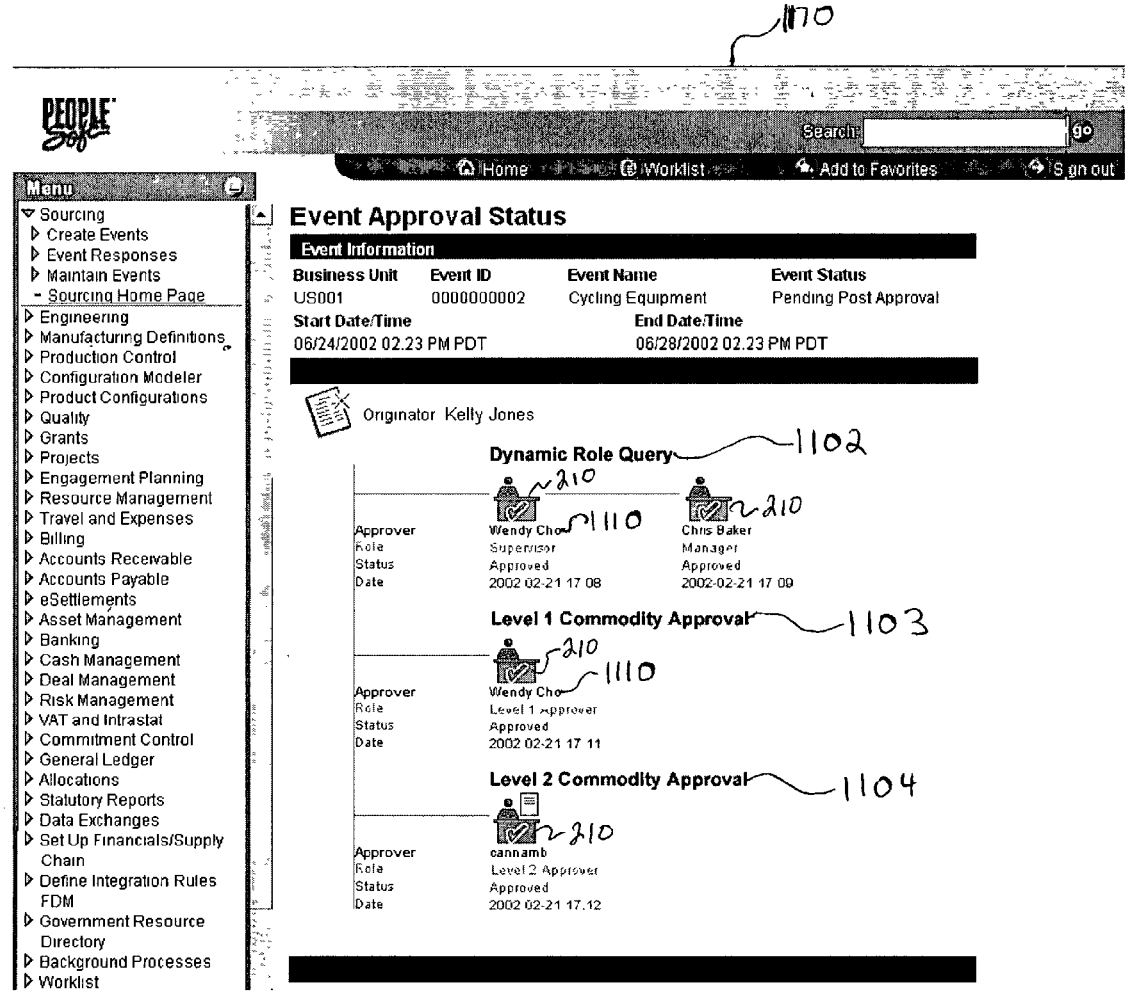
FIG. 11 is an illustration of an embodiment of an approval interface showing the status of three approval rules.

As illustrated in FIG. 11 the status of an approval process may be viewed by a requestor or other interested party. FIG. 11 illustrates an embodiment of a status interface 1170 showing the status of three dynamic approval rules 200 ("Dynamic Role Query" 1102, "Level 1 Commodity Approval" 1103 and "Level 2 Commodity Approval" 1104). This embodiment of status interface 1170 shows that status of an approval request having rule steps 210 executed both in series and in parallel. Also in this example, two of the dynamic approval rules 200 include one approver, Wendy Cho 1110, in common. In some embodiments this approver would receive one request for approval that would satisfy both dynamic approval rules 1102 and 1103.

Several embodiments are specifically illustrated and/or described herein. However, it will be appreciated that modifications and variations are covered by the above teachings and within the scope of the appended claims without departing from the spirit and intended scope thereof. For example, the present invention may be applied to reviewing as well as approval processes and is not limited to the applications or business objects used herein as illustrative examples. In many of the examples discussed, a reviewer may be substituted for an approver. Likewise, use of an "organizational chart" or "business organizational chart" to determine relationships between parties is meant to encompass use of any data identifying relationships between members of an organization. It is anticipated that the systems and methods disclosed herein may be applied to other activities requiring discrete sequential steps such as project scheduling and tracking.

We claim:

1. A system for processing an approval request in a network-based software application, the system comprising:
one or more processors associated with one or more server computers; and
a memory coupled to the one or more processors and storing a set of instructions representing the network-based software application that when executed by the one or more processors configure the one or more processors for processing the approval request, the set of instructions comprising:

instructions configured to display in the network-based software application a dynamic approval rule building interface to users of a networked computer that enables the users to create dynamic approval rules for business objects of the network-based software application;

instructions configured to receive first input provided by a user of the networked computer via the dynamic approval rule building interface to create a plurality of approval rule steps associated with at least one dynamic approval rule;

instructions configured to generate the plurality of approval rule steps associated with the at least one dynamic approval rule based on the first input provided by the user of the network computer via the dynamic approval rule building interface;

instructions configured to receive second input provided by the user of the network computer via the dynamic approval rule building interface to create criteria for at least one approval rule step in the plurality of approval rule steps associated with the at least one dynamic approval rule;

instructions configured to generate the criteria for the at least one approval rule step in the plurality of approval rule steps associated with the at least one dynamic approval rule based on the second input provided by the user of the network computer via the dynamic approval rule building interface;

instructions configured to receive third input provided by the user of the network computer via the dynamic approval rule building interface to create one or more values characterizing the criteria for the at least one approval rule step;

instructions configured to generate one or more values characterizing the criteria for the at least one approval rule step based on the third input provided by the user of the network computer via the dynamic approval rule building interface;

instructions configured to store the at least one dynamic approval rule in a database associated with the network-based software application using the plurality of approval rule step, the criteria for the at least one approval rule step, and the one or more values characterizing the criteria for the at least one approval rule step;

instructions configured to display in the network-based software application an approval interface to an approver to approve or deny the approval request;

instructions configured to load the at least one dynamic approval rule from the database in response to execution of a business object of the network-based software application that generates the approval request;

instructions configured to determine whether at least one of the approval rule steps in the plurality of approval rule steps associated with the at least one dynamic approval rule applies to the approval request;

instructions configured to, if no rule approval rule step in the plurality of approval rule steps associated with the at least one dynamic approval rule applies to the approval request, set a parameter indicating no approval is needed;

instructions configured to, if at least one of the approval rule steps in the plurality of approval rule steps associated with the at least one dynamic approval rule applies to the approval request, determine if two or more approval rules steps in the plurality of approval rule steps associated with the at least one dynamic approval rule apply to the approval request;

instructions configured to, if only one approval rule step in the plurality of approval rule steps associated with the at least one dynamic approval rule applies to the approval request, execute the one approval rule step, wherein the approval interface is display to the approver seeking an approval from the approver;

instructions configured to, if two or more approval rule steps in the plurality of approval rule steps associated with the at least one dynamic approval rule apply to the approval request, determine an approval rule step order from the at least one dynamic approval rule;

instructions configured to execute a first approval rule step in the determined approval rule step order, wherein the approval interface is displayed to the approver seeking an approval from the approver.

2. The system of claim 1, wherein the set of instructions stored in the memory further include instructions configured to execute a second approval rule step in the determined approval rule step order.

3. The system of claim 1, wherein the set of instructions stored in the memory further include instructions configured to show to the approver a current status of the approval request.

4. The system of claim 1, wherein the set of instructions stored in the memory further include instructions configured to add a new approval rule step to the determined approval rule step order.

5. The system of claim 1, wherein the instructions configured to display in the network-based software application the approval interface further include instructions configured to enable the approver to approve a subset of the approval request.

6. The system of claim 1, further comprising instructions configured to display in the network-based software application a status interface configured to show a status of the approval request.

7. A method of processing an approval request in a network-based software application, the method comprising:

forwarding, from a server computer hosting the network-based software application to a networked computer, information configured to display a graphical user interface to users of the networked computer that enables the users to create within the network-based software application dynamic approval rules for business objects of the network-based software application;

receiving, at the server computer, first input provided by a user of the networked computer via the graphical user interface to create a plurality of approval rule steps associated with at least one dynamic approval rule;

generating, with a processor associated with the server computer, the plurality of approval rule steps associated with the at least one dynamic approval rule based on the first input provided by the user of the network computer via the graphical user interface;

receiving, at the server computer, second input provided by the user of the network computer via the graphical user interface to create criteria for at least one approval rule step in the plurality of approval rule step associated with the at least one dynamic approval rule;

generating, with the processor associated with the server computer, the criteria for the at least one approval rule step in the plurality of approval rule steps associated with the at least one dynamic approval rule based on the second input provided by the user of the network computer via the graphical user interface;
receiving, at the server computer, third input provided by the user of the network computer via the graphical user interface to create one or more values characterizing the criteria for the at least one approval rule step;
generating, with the processor associated with the server computer, one or more values characterizing the criteria for the at least one approval rule step based on the third input provided by the user of the network computer via the graphical user interface;
storing the at least one dynamic approval rule in a database in communication with the first server computer using the generated plurality of approval rule steps, the generated criteria for the at least one approval rule step, and the generated one or more values characterizing the criteria for the at least one approval rule step;
loading, with the processor associated with the server computer, the at least one dynamic approval rule from the database in response to execution of a business object of the network-based software application that generates the approval request;
determining, with the processor associated with the server computer, if at least one of the approval rule steps in the plurality of approval rule steps associated with the at least one dynamic approval rule applies to the approval request;
if no approval rule step in the plurality of approval rule steps associated with the at least one dynamic approval rule applies to the approval request, setting a parameter indicating no approval is needed with the processor associated with the server computer;
if at least one of the approval rule steps in the plurality of approval rule steps associated with the at least one dynamic approval rule applies to the approval request, determining, with the processor associated with the server computer, if two or more approval rule steps apply to the approval request;
if only one approval rule step in the plurality of approval rule steps associated with the at least one dynamic approval rule applies to the approval request, executing the one approval rule step with the processor associated with the server computer, wherein an approval interface is delivered to an approver seeking an approval from the approver;
if two or more approval rule steps in the plurality of approval rule steps associated with the at least one dynamic approval rule apply to the approval request, determining an approval rule step order with the processor associated with the server computer from the at least one dynamic approval rule; and
executing a first approval rule step in the determined approval rule step order with the processor associated with the server computer, wherein an approval interface is delivered to an approver seeking an approval from the approver according to the first approval rule step.

8. The method of claim 7, further including executing the second approval rule step in the determined rule step order with the processor associated with the server computer, wherein an approval interface is delivered to an approver seeking an approval from the approver according to the second approval rule step.

9. The method of claim 8, wherein the first approval rule step in the determined rule step order and the second approval rule step in the determined rule step order are executed in parallel.

10. The method of claim 7, further including:
determining if an approval rule step in the determined rule step order should be skipped with the processor associated with the server computer;
if an approval rule step in the determined rule step order should be skipped, skipping the approval rule step in the determined rule step order; and
if an approval rule step in the determined rule step order should not be skipped, executing the approval rule step in the determined rule step order with the processor associated with the server computer.

11. The method of claim 10, further comprising receiving a time-out at the server computer, and wherein the approval rule step is skipped responsive to the time-out.

12. The method of claim 10, further comprising escalating the approval rule step with the processor associated with the server computer, and wherein the approval rule step is skipped responsive to the escalation.

13. The method of claim 7, further comprising delivering a status interface with the processor associated with the server computer showing a status of the approval request.

14. The system of claim 7, wherein the approval interface shows to the approver a current status of the approval request.

15. A non-transitory computer-readable medium storing code which when executed by a processor of a computer system configure the processor for processing an approval request in a network-based software application, the non-transitory computer-readable medium comprising:
code for forwarding, from the network-based software application, information configured to display a graphical user interface to users of a networked computer that enables the users to create within the network-based software application dynamic approval rules for business objects of the network-based software application;
code for receiving first input provided by a user of the networked computer via the graphical user interface to create a plurality of approval rule steps associated with at least one dynamic approval rule;
code for generating the plurality of approval rule steps associated with the at least one dynamic approval rule based on the first input provided by the user of the network computer via the graphical user interface;
code for receiving second input provided by the user of the network computer via the graphical user interface to create criteria for at least one approval rule step in the plurality of approval rule steps associated with the at least one dynamic approval rule;
code for generating the criteria for the at least one approval rule step in the plurality of approval rule steps associated with the at least one dynamic approval rule based on the second input provided by the user of the network computer via the graphical user interface;
code for receiving third input provided by the user of the network computer via the graphical user interface to create one or more values characterizing the criteria for the at least one approval rule step;
code for generating one or more values characterizing the criteria for the at least one approval rule step based on the third input provided by the user of the network computer via the graphical user interface;
code for storing the at least one dynamic approval rule in a database using the generated plurality of approval rule steps, the generated criteria for the at least one approval rule step, and the generated one or more values characterizing the criteria for the at least one approval rule step;
code for loading the at least one dynamic approval rule from the database in response to execution of a business object of the network-based software application that generates the approval request;

code for determining if at least one of the approval rule steps in the plurality of approval rule steps associated with the at least one dynamic approval rule applies to the approval request;

code for setting a parameter indicating no approval is needed if no approval rule step in the plurality of approval rule steps associated with the at least one dynamic approval rule applies to the approval request,;

code for determining if two or more approval rule steps apply to the approval request if at least one of the approval rule steps in the plurality of approval rule steps associated with the at least one dynamic approval rule applies to the approval request;

code for executing the one approval rule step if only one approval rule step in the plurality of approval rule steps associated with the at least one dynamic approval rule applies to the approval request, wherein an approval interface is delivered to an approver seeking an approval from the approver;

code for determining an approval rule step order from the at least one dynamic approval rule if two or more approval rule steps in the plurality of approval rule steps associated with the at least one dynamic approval rule apply to the approval request; and code for executing a first approval rule step in the determined approval rule step order, wherein an approval interface is delivered to an approver seeking an approval from the approver according to the first approval rule step.

16. The non-transitory computer-readable medium of claim 15, further including code for executing the second approval rule step in the determined rule step order, wherein an approval interface is delivered to an approver seeking an approval from the approver according to the second approval rule step.

17. The non-transitory computer-readable medium of claim 16, wherein the first approval rule step in the determined rule step order and the second approval rule step in the determined rule step order are executed in parallel.

18. The non-transitory computer-readable medium of claim 15, further including:
   code for determining if an approval rule step in the determined rule step order should be skipped;
   code for skipping the approval rule step in the determined rule step order if an approval rule step in the determined rule step order should be skipped; and
   code for executing the approval rule step in the determined rule step order if an approval rule step in the determined rule step order should not be skipped,.

19. The non-transitory computer-readable medium of claim 18, further comprising code for receiving a time-out, and wherein the approval rule step is skipped responsive to the time-out.

20. The non-transitory computer-readable medium of claim 18, further comprising code for escalating the approval rule step, and wherein the approval rule step is skipped responsive to the escalation.

21. The non-transitory computer-readable medium of claim 15, further comprising code for delivering a status interface showing a status of the approval request.

22. The non-transitory computer-readable medium of claim 15, wherein the approval interface shows to the approver a current status of the approval request.

* * * * *

UNITED STATES PATENT AND TRADEMARK OFFICE
CERTIFICATE OF CORRECTION

PATENT NO. : 8,725,548 B2  Page 1 of 1
APPLICATION NO. : 10/187351
DATED : May 13, 2014
INVENTOR(S) : Leitch et al.

It is certified that error appears in the above-identified patent and that said Letters Patent is hereby corrected as shown below:

In the Specification:

In column 7, line 36, delete "the a" and insert -- the --, therefor.

In the Claims:

In column 11, line 45, in Claim 1, delete "step," and insert -- steps, --, therefor.

In column 12, line 62, in Claim 7, delete "step" and insert -- steps --, therefor. (Second Occurrence)

In column 15, line 10, in Claim 15, delete "request,;" and insert -- request; --, therefor.

Signed and Sealed this
Seventh Day of October, 2014

Michelle K. Lee
*Deputy Director of the United States Patent and Trademark Office*